United States Patent [19]
Peng

[11] Patent Number: 4,760,500
[45] Date of Patent: Jul. 26, 1988

[54] READING LIGHT FOR VEHICLE

[76] Inventor: Chang S. Peng, 5F-3, No. 375, Sec. 4, Jen-Ai Road, Taipei, Taiwan

[21] Appl. No.: 105,091

[22] Filed: Oct. 6, 1987

[51] Int. Cl.$^4$ .......................... B60Q 1/00; F21V 3/00
[52] U.S. Cl. ........................................ 362/74; 362/61
[58] Field of Search ...................... 362/74, 61, 80, 83, 362/66, 140, 141, 142, 144

[56] References Cited

U.S. PATENT DOCUMENTS

| | | | |
|---|---|---|---|
| 4,213,169 | 7/1980 | Kampkers | 362/74 |
| 4,499,528 | 2/1985 | Hawlitzk | 302/74 |
| 4,646,210 | 2/1987 | Skogler et al. | 362/61 |

Primary Examiner—Raymond A. Nelli
Attorney, Agent, or Firm—Morton J. Rosenberg

[57] ABSTRACT

This invention relates to a reading light for a vehicle and in particular to one including an upper casing having an opening at its both sides, two outer frames each pivotally mounted in the the opening of the upper casing, two lamp holders each snap-fitted into a heat-dissipating hood and having an inner frame pivotally mounted in the outer frame, two lampshades fitted with the inner frames, two sockets fixedly mounted at the bottom of the lamp holders, two switches electrically connected with the sockets, two bulbs respectively connected with the two sockets and a lower casing engaged with the bottom of the upper casing whereby the lamp holders can be rotated to give light to any desired positions and the heat-dissipating hoods may prevent the bulbs from overheating thus enhancing the convenience and extending the service life thereof.

1 Claim, 5 Drawing Sheets

READING LIGHT FOR VEHICLE

BACKGROUND OF THE INVENTION

1. Field of the Invention

This invention concerns an improved reading light especially for use with vehicles.

2. Prior Art

It has long been known to mount a reading light in a vehicle. However, most of reading lights on the market can only give light in a fixed direction and furthermore, the bulbs thereof are easily burned out due to overheating. It would often be desrable to be able to provide a rotatable reading light with long service life.

It is therefore, an object of the present invention to provide a reading light which may obviate and mitigate the above-mentioned drawbacks.

SUMMARY OF THE INVENTION

This invention relates to a reading light especially used in vehicles.

It is the primary object of the present invention to provide a reading light which is provided with two rotatable lamps.

It is another object of the present invention to provide a reading light which has two heat-dissipating hoods enclosing the lamp holders so as to prevent the bulbs from overheating.

It is still another object of the present invention to provide a reading light which is simple in construction.

It is still another object of the present invention to provide a reading light which is economic to produce.

It is a further object of the present invention to provide a reading light which is easy to assemble.

Other objects, merits and advantages of the present invention will be obtained by those having ordinary skill in the art when the following detailed description of the preferred embodiment had been read in conjunction with the accompanying drawings wherein like numerals refer to like or similar parts and in which:

BRIEF DESCCRIPTION OF THE DRAWINGS

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employd herein is for the purpose of description and not of limitation.

Figure 1:
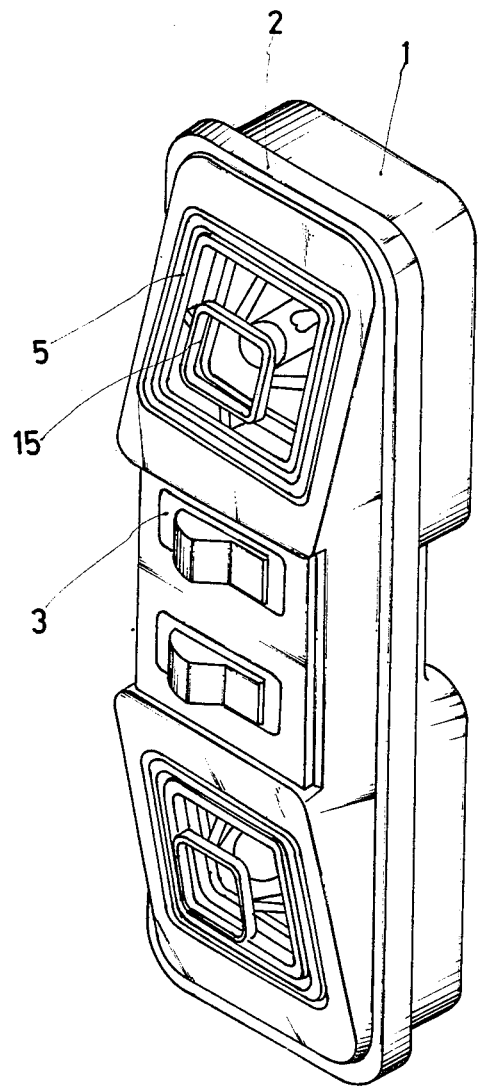
FIG. 1 is a perspective view of a reading light for vehicles according to the present invention.
Figure 2:
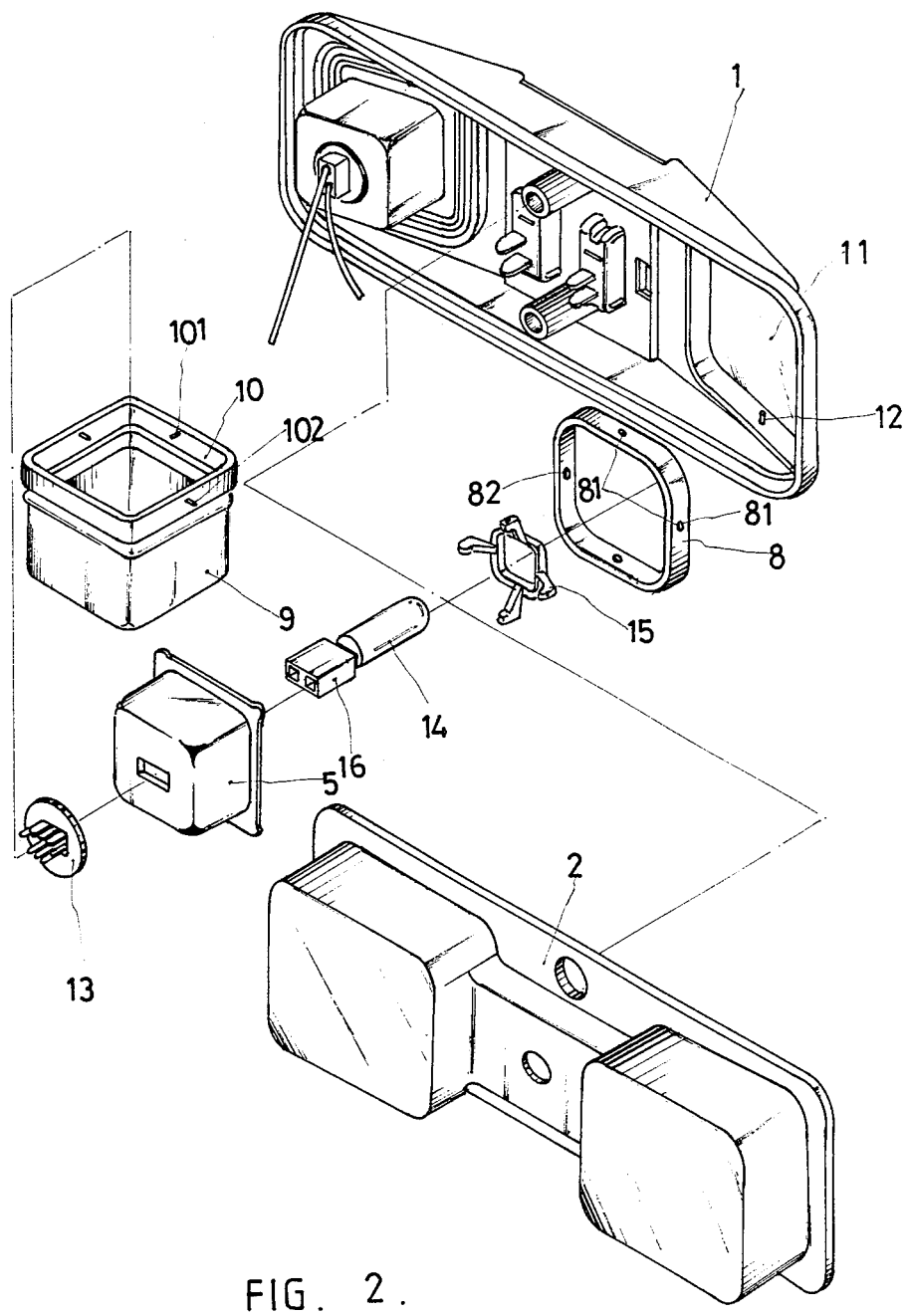
FIG. 2 is an exploded view of the reading light.
Figure 3:
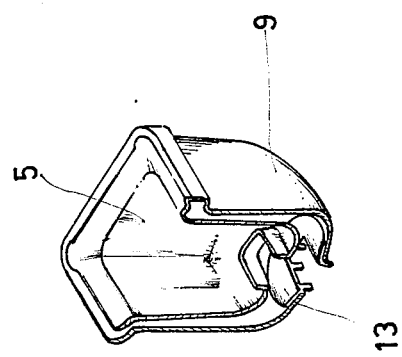
FIG. 3 shows the connection between the heat dissipating hood and the light holder.
Figure 4:
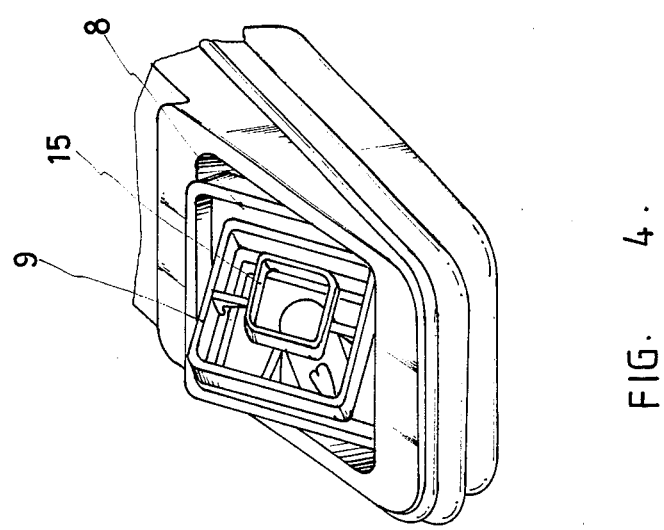
FIG. 4 is a fragmentary view showing the function of the revolving mechanism of the reading light.
Figure 5:
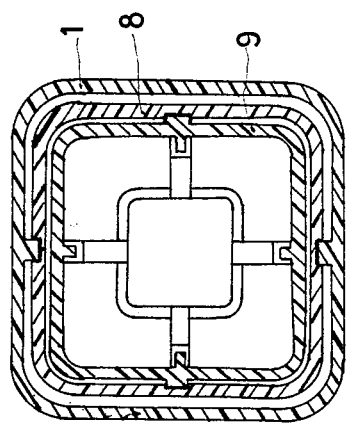
FIG. 5 is a sectional view showing the structure of the revolving mechanism of the reading light.

With reference to the drawings and in particular to FIGS. 1 and 2 thereof, the reading light according to the present invention mainly comprises an upper casing 1, a lower casing 2, two switches 3, two lamp holders 5, two heat dissipating hoods 9 and two bulbs 14. The upper casing 1. is formed at both sides thereof with an opening 11 having a pin 12 at its two opposite inner sides. An outer frame 8 with two recesses 81 adapted to receive the pins 12 of the opening 11 is engaged into the opening 11 so that the outer frame 8 may rotate about the pins 12. Each lamp holder 5 is snap fitted into a heat-dissipating hood 9 which has an inner frame 10 formed with two pins 102 adapted to the recesses 82 of the outer frame 8. The recesses 82 are formed at horizontal positions while the recesses 81 are arranged at vertical positions with reference to FIG. 2. Hence the inner frame 10 may rotate with respect to the outer frame 8 in one direction and the outer frame 8 may rotate relative to the upper casing 1 in another direction Since the lamp holder 5 is connected to the heat-disspating hood 9, it will move therewith and so it may be rotated to give light to any desired positions. The inner frame 10 of the heat-dissipating hood 9 is further formed with a pin 101 at each inner side thereof so as to engage with a lampshade 15. A socket 16 is rigidly mounted in a circular plate 13 which is in turn fixed in the lamp holder 5. The bulb 14 is inserted a corresponding socket 16. The lower casing 2 is fitted with the upper casing 1 to form a reading light.

Between the two lamp holders 5, there are two switches 3 mounted on the upper casing 1. The switches 3 are electically connected to corresponding sockets 16 in a known way and it is unnecessary to describe the circuit here.

This invention is chiefly characterized in the structure formed by the opening 11 of the upper casing 1, the outer frame 8 and the inner frame 10, and the heat-dissipating hood 9. By means of the above-mentioned structure, the lamp holder 5 can be rotated to give light to any desired positions. As to the heat-dissipating hood 9, the bulb 14 can be protected from overheating thereby extending the service life thereof.

Although this invention has been described with a certain degree of particularity, it is understood that the present disclosure is made by way of example only, and that numerous changes in the detail of construction and the component parts may be resorted to without departing from the spirit and scope of the invention as hereinafter claimed.

I claim:

1. A reading light for a vehicle comprising:
   an upper casing having an opening at both sides thereof, said opening being formed with a pin at two opposite sides thereof;
   two outer frames each having at opposite outer surfaces a recess adapted to receive the pin formed in the opening of the upper casing and at the other two opposite inner surfaces a recess;
   two lamp holders each snap-fitted into a heat-dissipting hood, said heat-dissipating hood having an inner frame formed with two pins adapted to the recesses at the inner sides of the outer frame and a pin at each inner side thereof;
   two lampshades each fitted with the pins at the inner side of the inner frame;
   two sockets each fixedly attached to an bottom end of the lamp holder;
   two switches electrically connected with the sockets;
   two bulbs respectively connected with the two sockets; and
   a lower casing engaged with the bottom of the upper casing;
   whereby the lamp holders can be rotated to give light to any desired positions and the heat-dissipating hoods may prevent the bulbs from overheating thereby enhancing the convenience and extending the service life thereof.

* * * * *